Jan. 12, 1960

J. V. FREDD 2,920,396

SURFACE CALIPER

Filed Dec. 23, 1957

INVENTOR.
JOHN V. FREDD

BY Robert O. Spindle

ATTORNEY

Jan. 12, 1960   J. V. FREDD   2,920,396
SURFACE CALIPER

Filed Dec. 23, 1957   4 Sheets-Sheet 2

INVENTOR.
JOHN V. FREDD
BY
*Robert O. Spindle*
ATTORNEY

Jan. 12, 1960  J. V. FREDD  2,920,396
SURFACE CALIPER
Filed Dec. 23, 1957  4 Sheets-Sheet 3
Fig. 6
Fig. 7
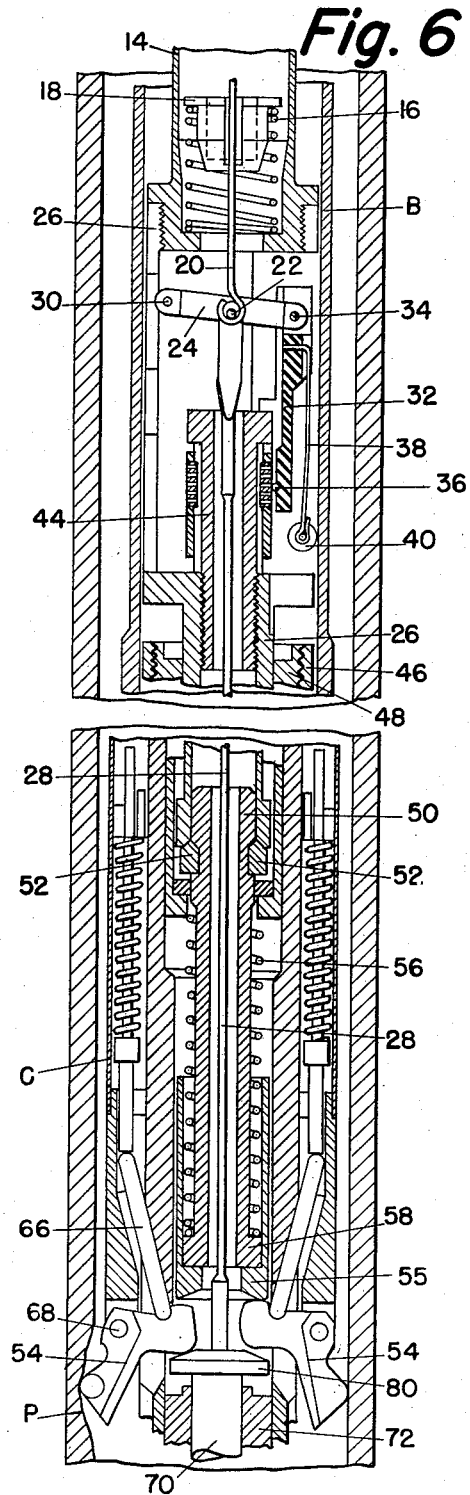
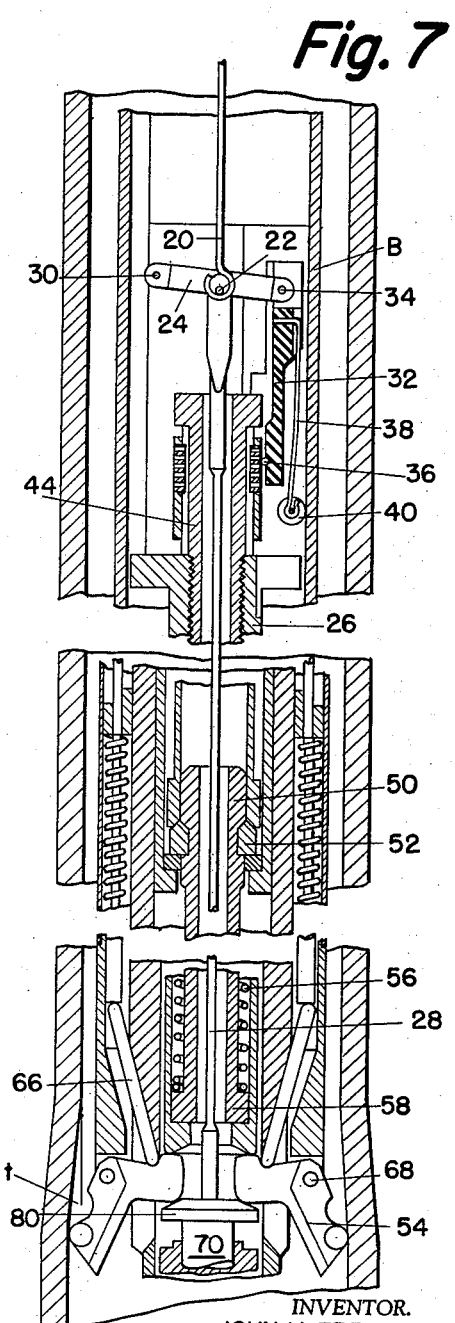
INVENTOR.
JOHN V. FREDD
BY
Robert O. Spindle
ATTORNEY United States Patent Office 2,920,396
Patented Jan. 12, 1960

2,920,396

SURFACE CALIPER

John V. Fredd, Dallas, Tex., assignor to Otis Engineering Corporation, Dallas, Tex., a corporation of Delaware Application December 23, 1957, Serial No. 704,538

6 Claims. (Cl. 33—178)

The present invention relates in general to tube calipering devices and particularly to such devices as are used in determining the acceptability of short lengths of tubing in stock piles and at derrick sites preliminary to use.

One form of device used for inspection of short lengths of tubing prior to insertion in petroleum producing wells has been disclosed in United States Patent No. 2,789,357, issued to Harry B. Schramm. The caliper disclosed and claimed in that patent is fully self-contained including the necessary surface-sensing elements and recording means within the caliper body. In operation it is required to disassemble the device after calipering several "joints" of tubing to determine their condition. It is an object of this invention to provide a calipering device which transmits the sensed condition of the interior surface of the tubing, electrically, for immediate determination of its condition.

The electrical transmission of information obtained by calipering is generally known. Present devices are capable of detecting defects in tubing and indicating the presence of the same electrically. However, these devices detect all irregularities as defects making no allowances for variations in the tubular structure permitted by manufacturing specifications and assembly details. It is a further object of this invention to provide a calipering device which transmits selected information electrically for immediate determination of the acceptance or rejection of the calipered joint without further inspection.

Yet another object is to provide an electrical transmitting calipering device which responds to all defects and assembly irregularities in tubing, but does not respond to defects affecting all the feelers within selected percentages of the tubing wall thickness.

Other objects and advantages of this invention will be apparent in the course of the detailed description which follows, taken with the accompanying drawings in which:

Figures 6, 7 and 8 are views in section, showing the responsive elements in several critical operating positions.

As stated above, it is a general object of the present invention to provide a tubing caliper which transmits selected information. It is of primary importance that information of pits and like depressions weakening the tubing strength to a dangerous degree, be relayed to the observer. Such information must be sensed and indicated. However, manufacturing defects such as variance of diameter within the limits of tolerances allowed, do not alone impair the tubing strength and can be ignored and need not be reported. An extension of this variance such as caliper sensing of collars or when the feelers are released from the tubing at the end of the operation are also calipering movements not required by the observer. These three conditions are those generally encountered in calipering tubing and form the basis of the selective operation of the disclosed mechanism.

In general, the invention includes a housing of size and shape to be passed through the tubing to be calipered. A quick engage-and-release electrical connection is the means for physically moving the device through the tubing, as well as supplying the electrical current for transmission of sensed information. Feelers are peripherally disposed about the housing and are independently and collectively urged into calipering contact with the tubing wall as disclosed, for example, in my United States Patent No. 2,596,924, issued May 13, 1952, and the like. The feeler movement in this disclosure does not become a recorded entry within the device as disclosed in the reference patent, but operates on electrically responsive elements which vary the electrical force transmitted to an externally positioned indicator or recorder through the connecting cable.

The electrically responsive means actuated by the feeler movement is a sliding element in the transmission circuit. A plurality of electrical conductors of varied resistances, for example, thus varying the amount of current or voltage passed through the indicator or recorder circuit, forms the contact surface for the sliding element. Then, by slidably moving the plurality of conductors as well as the sliding element of the transmission circuit, in response to different degrees of movement to which all feelers respond (in contrast with the movement of one or several feelers but less than all), selected feeler movement can be read.

Figure 1:
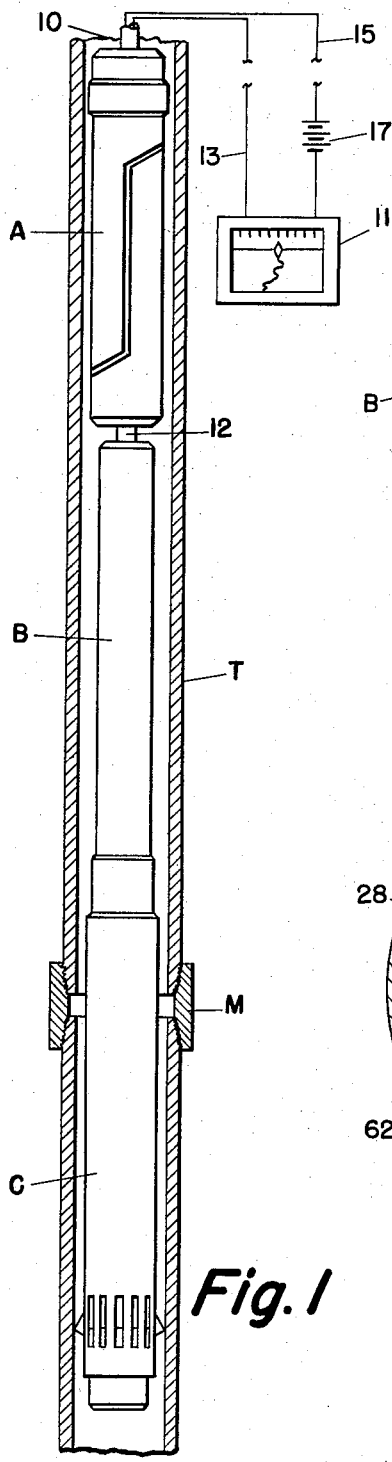
Figure 1 is an elevational view of the calipering device inserted in tubing.

One form of device is shown here in the accompanying drawing. Figure 1 shows the caliper in operating position in a section of tubing T. For purposes of clearer understanding later in discussing the operation of the device, the section of tubing T shown here, includes a collar M. As indicated above, the normal use of the device is to caliper single pieces of tubing, termed "joints" in the oil industry, preliminary to use. Under such conditions the collar M will be connected to one piece or length of tubing, but not uniting two lengths as shown here. The collar, however, limits the outward movement to substantially 50% of the tubing thickness ($t'$ of Figure 8), and as this is one feeler measurement which need not be indicated the collar is shown for purposes of operating explanation later in the specification.

At the top of Figure 1 the electrical connection for rapid connection-disconnection, is indicated as A. One-half of the connector is attached to cable 10 and the other forms the top of the caliper body. The electrical circuit is completed to connect with an indicator-recorder combination device 11 through conductors 13 and 15 and symbolic power supply 17. A physical connection, as distinguished from the electrical connection, normally of a universal type, is partially shown at 12 extending between and connecting section A and switch body assembly B. The section to connect the external and internal electrical elements noted as A, may be constructed with any of a number of conveniently available electrical connectors or a satisfactory one may be readily developed. This connector does not form any part of the device provided for the calipering operations as disclosed, except as one means for easy transmission of electrical signals and for physically moving the caliper through the tubing. It will be referred to again only as required to clearly describe the operation of the mechanism.

Returning to Figure 1, the portion of the caliper housing named the switch body assembly B is threadedly connected to the feeler head assembly C. The feelers which sense the interior wall irregularities of the tubing as well as diameter changes are mounted in this latter section. Elements necessary to the collective and separate operation of the feelers are also mounted in this section of the device and will be described in detail later.

Figure 2:
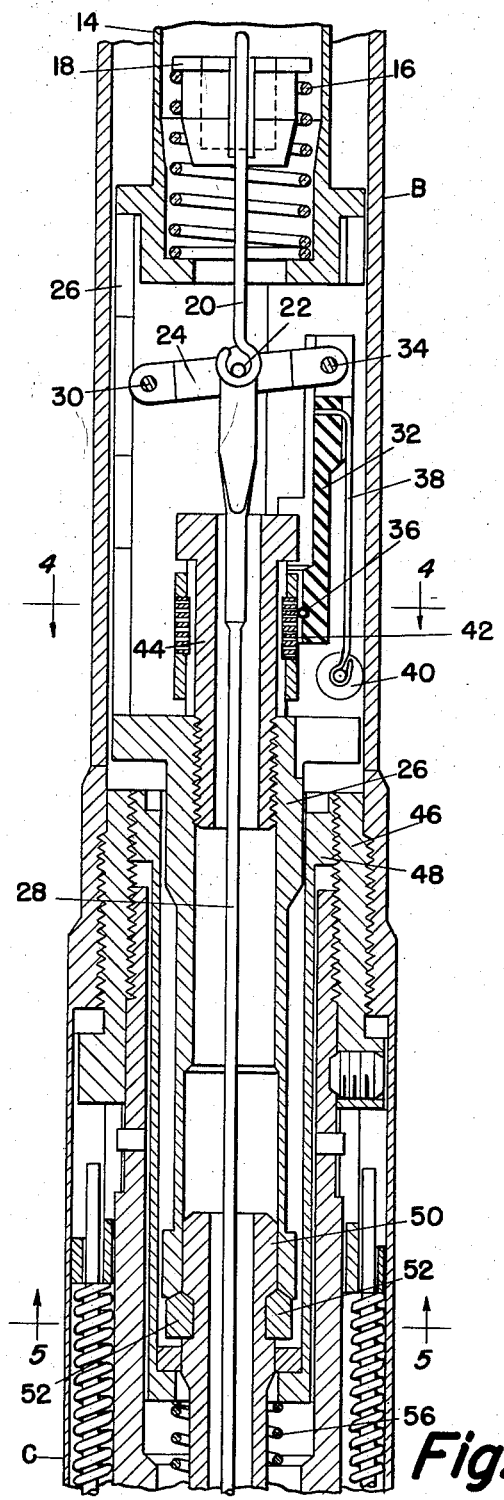
Figure 2 is an elevational view in section of the variable electrical transmission portion of the device.

Figure 2 shows an elevational view in section of the switch body assembly B with the switch elements inside in operative engagement. Beginning at the top of this figure, the body B mounts a lift spring retainer 14 which supports lift spring 16. Spring cup 18, enclosed by lift spring 16, fixedly supports clevis 20 pivotally connected at the "eye" end by roll pin 22 to the center of lever 24. The lift spring retainer 14 is positioned to support these associated elements by engagement with switch frame 26 with which it is shown in contact. Switch frame 26 is slidably contained within the switch body B. Movement of lever 24 is transmitted from the feelers by means of connecting rod 28.

Lever 24, pivotally connected at the mid-point as by roll pin 22 to clevis 20, as described above, is supported on switch frame 26 by roll pin 30 at one end and is pivotally connected on the opposite end to an electrically non-conductive contact arm 32 as by roll pin 34. By locating the several pivotal points in this way, the feeler movement is amplified in proportion to the relation of the several lever arm lengths. Contact rod 36 is connected to contact arm 32 for electrical engagement with other circuit elements. Slidable contact of the rod 36 in its fixed position on arm 32 with adjacent circuit elements is maintained by spring 38 supported in sliding contact with the interior of the housing by roller 40.

Figure 4:
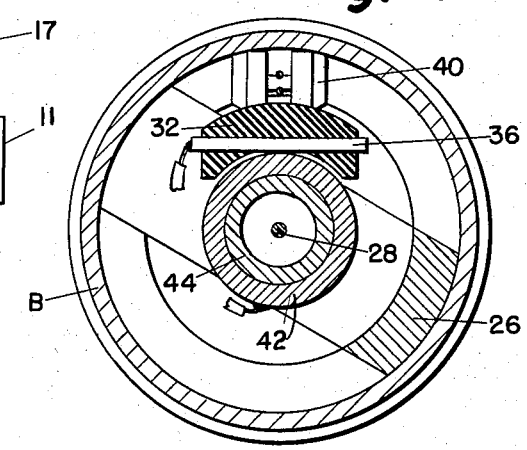
Figure 4 is a sectional view of Figure 2 on lines 4—4.

A plurality of electrical conductor bands 42 are arranged for separate contact with rod 36. These bands are electrically separated from each other and serve to distinguish the positions of the moving elements, for indicating and recording purposes. Only one of the bands is included in the electrical circuit at one time. A tubular mandrel 44 supports and positions the bands 42 and permits connecting rod 28 to pass through for operating engagement with the feelers. A sectional view of this arrangement is shown in Figure 4. In Figure 4, the pigtail lead adjacent one end of rod 36 indicates the electrical connection of this rod to a cable leading to recorder 11, while the pigtail lead adjacent bands 42 in this figure indicates the electrical connection of these bands to the multiple cable leading to the same recorder.

The longitudinal movement of the tubular mandrel 44 on which conductor bands 42 are mounted, is controlled by the movement of switch frame 26 to which the mandrel is threadedly connected.

Figure 5:
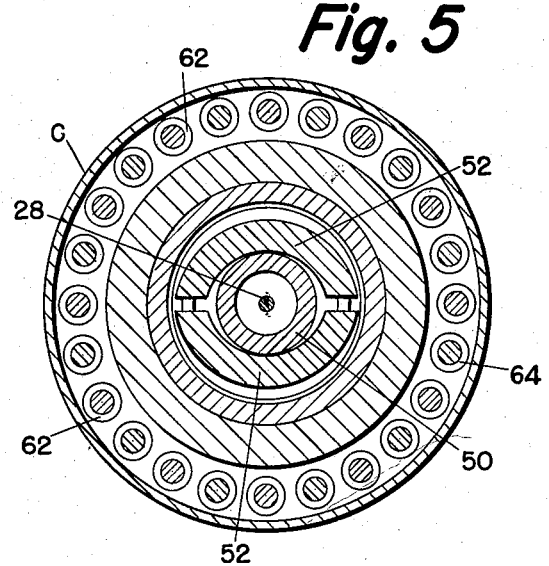
Figure 5 is a sectional view of Figure 2 on lines 5—5.

Tubular travel stop 48, flanged and threaded to engage head nut 46, extends into the feeler head assembly embracing the also extended switch frame 26 and contains one end of the tubular centering plunger 50. As indicated in Figure 2, the end of the centering plunger 50 extends internally into switch frame 26 and abuts the bottom of the frame against two transfer pawls 52—52 fitted into a groove in plunger 50. Figure 5 shows a cross-sectional view of this structure to facilitate the description, particularly of the operation of these elements.

Figure 3:
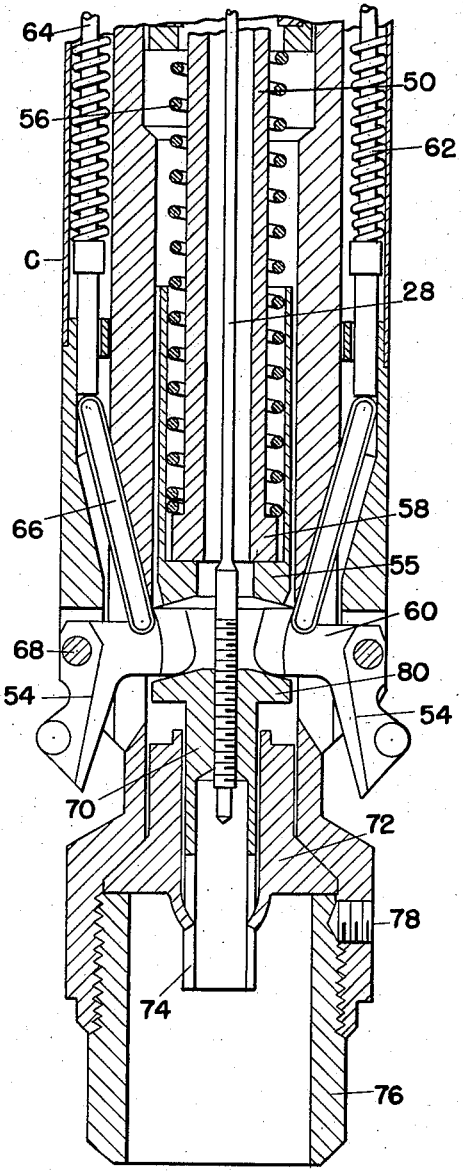
Figure 3 is an elevational view in section of the feeler portion which connects with the portion in Figure 2.

Figure 3 is an extension of the structure described above as Figure 2 and shows the centering plunger 50 extending into contact with the feelers 54. Centering spring 56 abutting the travel stop 48 in Figure 2, engages a shoulder portion 58 on centering plunger 50 resiliently urging the plunger into contact with all the inwardly extending arms 60 of the bell crank type feelers 54, by means of plunger cap 55. This common resilient means acting to urge all the feelers outwardly with equal force cooperates with individual springs 62 positioned by guides 64 which act through rods 66 to individually urge each feeler outwardly. Thus the feelers are pivoted about pivots 68 into calipering contact. As noted above, this structure has been previously described in United States Patent No. 2,596,924.

Opposing the resilient actions both for the feelers as a group and separately as described, longitudinally movable rod 28 threadedly engages the feeler support 70. Feeler support bushing 72 slidably positions support 70 and engages it in slots 74 and limits the extent of the outward movement of the feelers. Bushing 72 is held in fixed relation to the body of the device by retainer bushing 76 which is threaded into the feeler head section C and held by set screw 78. The flanged contact portion 80 of the feeler support 70 is shaped to respond to the movement of the feelers as they individually or collectively move in calipering response.

The operation of the device will be readily understood from the following description of Figures 2 through 8 of the drawing. Figures 2, 3, 4 and 5, described in detail above, show the elements of the device in normal position as it would be inserted in a tubing joint prior to calipering. Figure 3 shows the feelers in a "free" pre-entry position. In such position, although for convenience this is not illustrated in Figure 3, the feelers will extend outwardly until the downward travel of the contact portion 80 of the feeler support 70 is stopped by bushing 72. Lever 24 and contact bar 36 are correspondingly positioned.

The remaining figures to be described in detail show the elements in their respective relatively cooperating positions for performing the following generally described operations. The first position is shown in Figure 6 where one or any number less than all of the feelers is shown extended to detect a pit, depression, or other defect not encircling the tubing. The second position, as illustrated in Figure 7, shows all of the feelers extended a distance of more than 0% to less than 25% ($t$) of the tubing wall thickness. On reaching the upper range of this limit as when all feelers are extended 25% ($t$), the lower ends of the pawls 52—52 abut the upper shoulder of the travel stop 48 internal flange. This range of feeler extension is not recorded since it can be, and usually is, due to manufacturing tolerances, etc. However, the further extension of one or any number less than all, of the feelers beyond 25% of wall thickness under this condition will be recorded as a defect of that depth less the percentage of the least extended feeler which because of the operating range being considered must be 25%.

Figure 8:
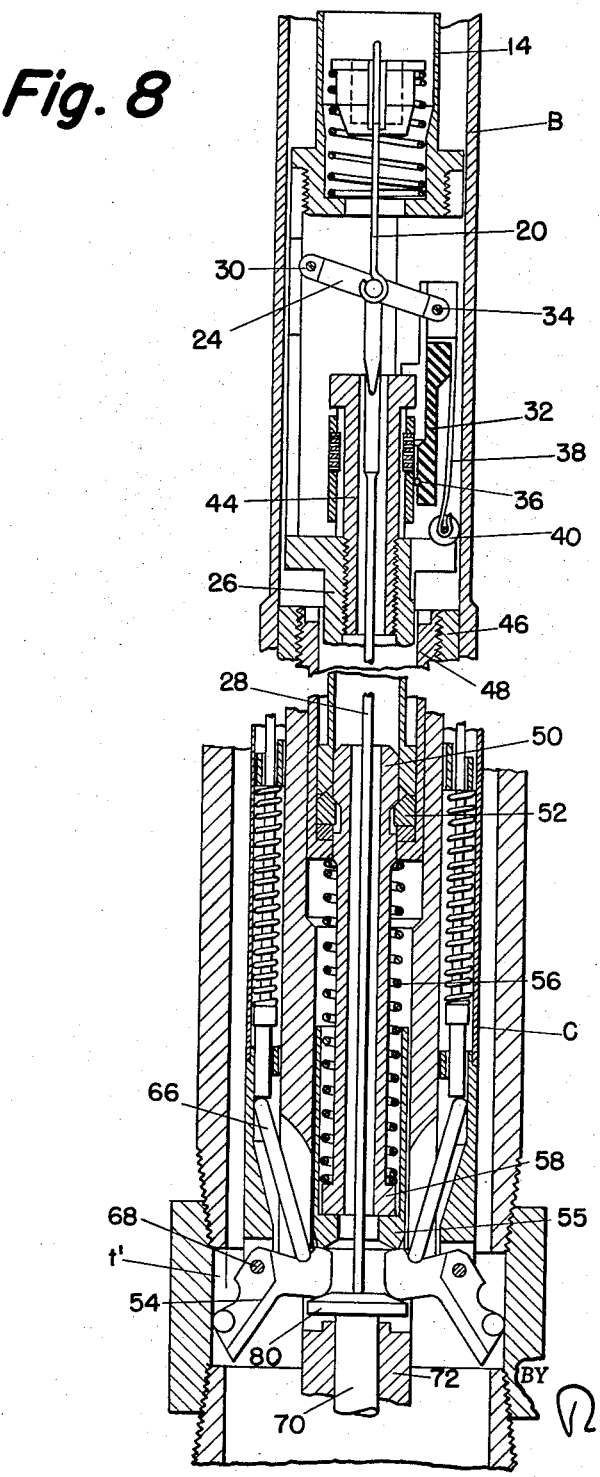

In the third operating position shown in Figure 8, all of the feelers are shown extended a distance within the range of 25% ($t$) to 50% ($t'$) of the tubing wall thickness. When all feelers are extended 50% ($t'$), the pawls 52—52 are totally displaced from centering plunger 50, and switch frame 26 is moved upwardly by the pawls to its maximum distance with respect to the pawls and contact rod 36. This extension of all the feelers to at least 50% ($t'$) of wall thickness places the switch frame and the attached electrical bands 42 at a position relative to contact 36 substantially as they were at the beginning of the operation or as described above for the first position. Between the 25% and 50% extended feeler position the switch frame returns to its initial position, and the contact bar moves from its 25% to its 50% position, thus producing a 50% signal. Therefore, the switch frame is positioned relative to the travel stop (or entire caliper) at its original zero position after the feelers have expanded to or beyond 50%. After the 50% ($t'$) point has been attained by all feelers, thus re-establishing the starting position of the electrical contacting elements, any further extension of any number of feelers will be detected and recorded in the conventional manner. The above generally described functional operation will be clear after reading the following detailed analysis of the movements of cooperating elements.

Figure 6 shows a feeler 54 extended into a pit P in the inside wall of the tubing. Although other feelers may be extended into other pits or depressions at this elevation in the tubing it is assumed that pit P is the deepest of these depressions. The effect of the feeler moving into this pit is to depress feelers support 70 further than any other feeler at the instant. The remaining feelers are then unsupported by feeler support 70 as shown. Due to the remaining feeler arms being maintained in their normal positions by the tubing wall, plunger cap 55 and centering plunger 50 do not move within the caliper housing. Tubular mandrel 44 with bands 42 is held in normal calipering position.

Connecting rod 28, threadedly connected to feeler support 70, as shown in Figure 3, pulls lever 24 downwardly causing contact rod 36 to slide on the electrically conducting bands 42. A band is contacted transmitting a signal through an individual one of the multiple conductors 13 and 15 commensurate with the calipering movement of the sensing feeler to an electrically motivated multichannel indicator-recorder 11 remote from the tubing. The bands 42 are connected to individual electrical circuits and the particular band contacted corresponds with the movement of contact rod 36. By means of the system 28, 34, 32, the feeler arm movement is made to produce an amplified movement of contact rod 36.

In Figure 7 the second of the three conditions, generally described above and previously mentioned as necessary to be included in the functions of the described device, is considered. Indicated in the figure, all feelers 54 move outwardly as would result where the internal diameter of the calipered tube increases by 25% of the tubing wall thickness, as indicated by the letter t. Under this condition, as the internal arms of the feelers pivot downwardly, centering plunger 50 also moves downwardly and is maintained in abutment with the feelers by centering spring 56. The maximum extent to which centering plunger 50 can move and yet remain in this second condition of measurement is indicated by showing transfer pawls 52 abutting the bottom of travel stop 48 and still firmly seated, laterally, in the grooves provided in the centering plunger. Further downward movement of plunger 50 will be considered in describing Figure 8.

As centering plunger 50 moves downwardly, transfer pawls 52 and contiguous switch frame 26 move likewise, due to the force impressed thereon through spring 16. In this connection, it will be realized that when feeler support 70 moves downwardly due to any or all of the feelers 54 moving outwardly (as previously described in connection with Figure 6), connecting rod 28 pulls lever 24 downwardly or in a clockwise direction about roll pin 30. The force on roll pin 22 is then transmitted through clevis 20 and spring cup 18 to spring 16, compressing said spring against lift spring housing 14 which bears against switch frame 26. Thus, as the centering plunger 50 moves downwardly, switch frame 26, together with mandrel 44 connected thereto, moves likewise; thus, conducting bands 42 move downwardly.

Together with the movement of the centering plunger, feeler support 70 is also depressed as has previously been considered in describing Figure 6. Connecting rod 28 is required to move to the same extent as the support to which it is connected. The result of both these movements (that of the bands 42 and that of the contact rod 36) is that they compensate for each other keeping contact rod 36 in the same signal area of the bands 42, thereby not indicating the enlargement of the tubing diameter as a condition detrimental to further usefulness.

The final condition of measurement for which this specifically disclosed form of caliper is designed is shown in Figure 8. Here all the feelers are shown extended a distance equal to that of 50% (t') of the tubing wall thickness. This extended movement of the feelers reduces opposition to the united forces of the centering spring 56 affecting all feelers generally and the combined individual forces of springs 62 on each of the feelers individually. As a result the centering plunger 50 moves downwardly further than before described by spreading the transfer pawls into the space allowed, laterally by exerting longitudinally directed force on the beveled faces of the pawls. As the pawls move outwardly, switch frame 26 is displaced upwardly. When the pawls have been totally displaced from the centering plunger groove, switch frame 26 is displaced upwardly a maximum distance due to its sliding engagement with the pawls. Thus, contact rod 36 is positioned as a function of the farthest extended feeler relative to the caliper proper, proportional to the radius reached by the farthest extended feeler. The switch frame, mounting the contact bands 42, however, is positioned as a function of the least extended feeler of all extended outwardly and moves a predetermined amount. From 0% to 25%, this movement of the switch frame is in direct proportion to the movement of the least extended feeler of all as they extend; from 25% to 50% the switch frame is moved in inverse proportion; and over 50%, the switch frame remains fixed at zero. Should any number of the feelers less than all then continue to move outwardly (in either of these selected conditions where all feelers move), the calipering operation will then move the electrical elements relative to each other as in the initial calipering operation.

Thus the individually operating feelers transfer the sensed information at any percentage of the tubing wall thickness. When all feelers extend as described above, then the sensing is controlled as desired within specific limits.

The elements of the device and their cooperation in the calipering operation are as described above. As used in the field to ascertain the usefulness of tubing, the caliper is successively passed through tubing lengths in stock piles. The cable-connected half of the electrical connection A is passed through each joint of tubing to receive the remainder of the device at the opposite end. After connection the caliper is pulled through the tube, attention being given to the electrical indication on an electrically sensitive receiving device, showing the tubing condition. As described only those defects definitely affecting the tubing usefulness are indicated. Other defects or conditions as those suggested, although common and frequently encountered are not indicated. No further inspection is required.

It will be evident that many modifications of the disclosed device within the scope of this disclosure are possible. For example, the relative movements of the cooperating elements may be extended beyond the three disclosed here to embrace other movements to greater or lesser extent. The quantity and types of electrical excitation resulting from these or other modified movements of the elements may likewise be varied. All these are within the knowledge and intent of the inventor and may be incorporated in the disclosed device as a matter of simple mechanical development.

I claim:

1. An internal tube wall calipering device comprising a housing, an electrical cable connected thereto to pull the housing through a length of tubing and to transmit electrical signals therefrom, a plurality of feelers mounted circumferentially about said housing, feeler operating means separately and collectively urging the feelers into calipering engagement, resiliently supported feeler position sensing means opposing the feeler operating means, relatively movable electrical contact means electrically connected to said cable responsive to the movement of the collective feeler operating means and the separate feeler position sensing means transmitting electrical signals in proportion to the most extended movement of any individual feeler and seleced extensions of the collective calipering movement of all the feelers.

2. A calipering device for sensing and transmitting internal tube wall configurations electrically comprising a housing, a plurality of feelers mounted circumferentially about the housing, resilient means for separately and collectively urging said feelers into calipering contact with the tubing wall; longitudinally movable feeler position sensing means in cooperating engagement with said feelers, electrical contact means connected to the feeler position sensing means, a plurality of electrical contacts in sliding engagement with the electrical contact of the feeler position sensing means, means supporting the plurality of electrical contacts longitudinally slidable in said housing in response to the movement of the collective feeler urging means, and cable means connected to move the housing in the calipering operation and electrically transmit the relative position information of the relatively movable electrical contacts.

3. A calipering device for electrically transmitting the sensed configurations of the internal wall of tubing lengths comprising an electrical circuit, relatively movable electrical contacts connected into said circuit, a housing positioning the electrical contacts in operating position therein, a plurality of feelers mounted on the housing and resiliently urged into calipering contact with the tubing wall, means connecting one of said contacts to respond to all calipering positions of the feelers, and separate means connecting the other electrical contact to respond to the extent of the movement of the least extended feeler only when all feelers move simultaneously.

4. A calipering device for electrically transmitting the sensed configurations of the internal wall of tubing lengths comprising a housing, a cable with electrical conductors therein connected to move the housing through the tubing, a plurality of bellcrank feelers positionally spaced circumferentially of the housing to contact the tubing wall and extend inwardly of said housing, independent resilient means separately urging each of said feelers outwardly of the housing, additional resilient means to collectively urge all feelers outwardly and adapted to slide longitudinally of said housing in response to the simultaneous movement of all feelers, feeler position sensing means in cooperative engagement with all feelers, single electrical contact means operatively connected to the feeler position sensing means, a plurality of separate electrical contacts to determine variations of feeler position mounted in sliding engagement with the single electrical contact means and slidable relative to both said single contact and the housing, and means connecting said slidable plurality of electrical contacts with the resilient means collectively urging all feelers outwardly, whereby the transmitted electrical information is responsive to both individual and collective feeler movement.

5. In tubing calipering devices wherein a plurality of feelers peripherally positioned about a housing sense the internal tubing wall configuration on being passed therethrough, an improvement in the feeler movement transmitting means comprising two relatively slidable electrical contacts adapted to slidably engage each other, one longitudinally slidable in the housing in response to outward movement of any of the feelers either independently or collectively, the other slidable to the extent of the least extended feeler but only when all feelers move simultaneously.

6. Electrical means for measuring the surface sensing movement of a plurality of feelers in internal tubing calipers comprising individual feeler sensing means responsive to the movement of the single feeler calipering the deepest tubular depression at any instant, means connecting the individual feeler movement sensing means with a single longitudinally movable electrical contact, resilient means urging all of said feelers into calipering contact, slidable mounting means positioning a plurality of electrical contacts in cooperating engagement with the single electrical contact and in abutting contact with said resilient means whereby the movement of individual feelers moves the single electrical contact to a signaling position relative to the plurality of electrical contacts and the simultaneous movement of all feelers moves both the single electrical contact and the plurality of electrical contacts to a predetermined signaling position determined by the least extended of all said feelers.

References Cited in the file of this patent
UNITED STATES PATENTS

| 2,596,924 | Fredd | May 13, 1952 |
| 2,640,271 | Boucher | June 2, 1953 |
| 2,695,456 | Roberts | Nov. 30, 1954 |
| 2,789,357 | Schramm | Apr. 23, 1957 |